(12) United States Patent
Levin et al.

(10) Patent No.: US 12,112,773 B2
(45) Date of Patent: Oct. 8, 2024

(54) METHOD AND APPARATUS FOR PRODUCTION OF A REAL-TIME VIRTUAL CONCERT OR COLLABORATIVE ONLINE EVENT

(71) Applicants: Andrew Levin, Warminster, PA (US); Aaron Cohen, Jenkintown, PA (US); Kyle Levin, West Chester, PA (US)

(72) Inventors: Andrew Levin, Warminster, PA (US); Aaron Cohen, Jenkintown, PA (US); Kyle Levin, West Chester, PA (US)

( * ) Notice: Subject to any disclaimer, the term of this patent is extended or adjusted under 35 U.S.C. 154(b) by 156 days.

(21) Appl. No.: 17/726,103

(22) Filed: Apr. 21, 2022

(65) Prior Publication Data

US 2022/0343951 A1    Oct. 27, 2022

Related U.S. Application Data

(60) Provisional application No. 63/178,017, filed on Apr. 22, 2021.

(51) Int. Cl.
| | |
|---|---|
| *G06F 3/16* | (2006.01) |
| *G06F 3/01* | (2006.01) |
| *G06F 3/04815* | (2022.01) |
| *G06T 13/40* | (2011.01) |
| *G06T 19/00* | (2011.01) |
| *G11B 27/031* | (2006.01) |

(52) U.S. Cl.
CPC .......... *G11B 27/031* (2013.01); *G06F 3/011* (2013.01); *G06F 3/04815* (2013.01); *G06T 13/40* (2013.01); *G06T 19/006* (2013.01)

(58) Field of Classification Search
CPC ... G11B 27/031; G06F 3/011; G06F 3/04815; G06T 13/40; G06T 19/006
See application file for complete search history.

(56) References Cited

U.S. PATENT DOCUMENTS

| | | |
|---|---|---|
| 10,156,898 B2 | 12/2018 | Prosserman et al. |
| 10,296,281 B2 | 5/2019 | Prosserman et al. |
| (Continued) | | |

FOREIGN PATENT DOCUMENTS

WO    WO-2021246498 A1 * 12/2021    ........ H01M 10/4257

*Primary Examiner* — Joseph Saunders, Jr.
(74) *Attorney, Agent, or Firm* — Joseph P. Kincart; Tracnik Law PLLC

(57) ABSTRACT

Methods and apparatus for producing virtual concerts or other online collaborative events. One or more musicians or other presenters or contributors at disparate geolocations transmit continuums of audio and/or image data as well as synchronization data continuums. Digital processing may be used to superimpose musicians or other presenters or contributors onto a virtual background (such as a concert stage or other virtual environment). Audio and video feeds from multiple musicians or other presenters or contributors may be synchronized to give the appearance of each being on the same stage in a 2D, 3D or virtual reality (VR) environment. Multiple continuums of audio data may be transmitted at different speeds and quality in order to allow musicians, presenters or other contributors to remain synchronized while a remote production studio receives high quality data transmissions for generation of a combinative, immersive, multi-dimensional end user audio/visual experience.

20 Claims, 15 Drawing Sheets

(56) References Cited

U.S. PATENT DOCUMENTS

| | | |
|---|---|---|
| 10,664,225 B2 | 5/2020 | Prosserman et al. |
| 2015/0124048 A1 | 5/2015 | King |
| 2015/0221334 A1 | 8/2015 | King et al. |
| 2015/0222935 A1 | 8/2015 | King et al. |
| 2015/0256473 A1* | 9/2015 | Walker .................. H04L 67/142 370/253 |
| 2015/0256762 A1 | 9/2015 | King |
| 2015/0304724 A1 | 10/2015 | Prosserman et al. |
| 2018/0227464 A1 | 8/2018 | King |
| 2018/0227501 A1 | 8/2018 | King |
| 2018/0227504 A1 | 8/2018 | King |
| 2018/0227572 A1 | 8/2018 | King |
| 2018/0227694 A1 | 8/2018 | King |

* cited by examiner

METHOD AND APPARATUS FOR PRODUCTION OF A REAL-TIME VIRTUAL CONCERT OR COLLABORATIVE ONLINE EVENT

CROSS REFERENCE TO RELATED APPLICATIONS

This application claims the benefit of U.S. Provisional Application No. 63/178,017 filed Oct. 11, 2019 and titled METHOD AND APPARATUS FOR ENHANCED AUDIO VISUAL SOUNDSTATION, the entire contents of which is incorporated herein by reference.

FIELD OF THE INVENTION

The present invention relates to a method and apparatus for generation of a real-time mixed online performance or other collaborative event for live broadcast or distribution with performers or other participants located at disparate geolocations and presented in a single virtual venue in a synchronized manner and presentation.

BACKGROUND OF THE INVENTION

Musical concerts and other live presentations date back to the 16th Century when people would pay to gather and listen to popular performers or presenters of the day. Since then, the number of performers or presenters, venue size, special effects and many other parameters have increased dramatically. Concerts and presentations have become such significant events that people will travel across the world to see their favorite performers and presenters.

Such travel to attend concerts and other events can be cost- and time-prohibitive. Moreover, certain public health emergencies may make travel or gathering impossible. Thus, many concerts and other live presentations are inaccessible to the public at large.

Moreover, collaborating performers or presenters may live in disparate parts of the world. Bringing those performers or presenters together to a single venue increases the cost to produce the events, which in turn increases the cost to the audience.

SUMMARY OF THE INVENTION

Accordingly, the present invention provides a method and apparatus for creating virtual, real-time, immersive, multi-dimensional concert or other presentation experiences that can unite musicians or presenters and audiences or attendees around the world.

According to the present disclosure, one or more musicians or presenters at one or more remote geolocations is captured via audio and video recording equipment while performing a musical composition or other collaborative presentation. The musician(s) or presenter(s) may be captured against a green screen backdrop in order to facilitate digitization. These audio and video captures are converted into data streams at each remote location (i.e., locally) which are then employed for two discrete purposes.

In some variants of the present invention, the data may first be distributed to performers or presenters via peer-to-peer network to provide a monitor system for the audio and video, which allows the performers or presenters along with remote production engineers to interact in real time or with the lowest latency possible.

In some embodiments the data may also be employed in a virtual production system in order to create a live or pre-recorded production of the event for broadcast via conventional media and/or streaming via internet to remote audiences. To accomplish this, the system transmits a high-quality multi-track stream from each performer or presenter via broadband or similar internet connection to a computer server located in a remote production studio or cloud environment, where the respective audio and video of each musician or presenter can be synchronized with those of the other contemporaneous performers or presenters in other geolocations. The synchronized audio and video may then be refined and enhanced in various ways and embedded into a virtual 3D environment (i.e., a virtual stage or digital venue) that can resemble any existing or imagined concert hall or event space. This creates the impression within the broadcast/stream production that the performers or presenters are together as if they were physically in the same geolocation (i.e., on the same stage).

In some variants of the present invention, performers or presenters may be represented by avatars, digital animations or holograms in the production rather than by their actual images. Further, avatars and humans may be combined and/or interact. Still further, with the synchronized audio and video embedded into a virtual environment in this manner, digital effects including virtual concert or event lighting and animated graphics can be introduced and the resulting enhanced production may then be transmitted to end users (audiences or event attendees) via broadcast over conventional media and/or streamed to such end users over the internet in standard, High-Definition (HD) and/or Virtual Reality (VR) formats.

In some embodiments, production may also be transmitted back to one or more of the performers or presenters such that they can see each other in the virtual environment, providing a visual monitor of the final collaborative performance or presentation being shown to the end users. In some embodiments, the transmission to the end users may occur in a manner that facilitates a VR experience, allowing for them to be immersed in this virtual environment in various ways including via reciprocal live audio and/or video stream created by the end users and transmitted back to the remote production server where it can be synchronized with the audio and video data stream of the event and embedded into the virtual production and/or via avatars representing and being controlled by end users that can be engaged in a virtual audience or attendee group.

Some results of this functionality is the creation of real-time, immersive, multi-dimensional concert or presentation experiences for both the performers or presenters and the end user audiences or attendees. Moreover, in some embodiments, the apparatus and processes presented are compatible and appropriate for use with technologies of virtual gathering in cyberspace such as that presently known as the "Metaverse" as well as others not yet invented or named.

Embodiments of the present disclosure may include a method for generating a collaborative concert with participants at disparate geolocations, the method including the steps of capturing audio data at least a first geolocation and a second geolocation. Embodiments may also include with a local audio processor computer at each of the first geolocation and the second geolocation, processing the audio data captured at the respective geolocations.

Embodiments may also include establishing peer to peer connections between the local audio processor at each of the first geolocation and the second geolocation and a remote audio processing computer. Embodiments may also include receiving the processed audio captured at the first geolocation and the second geolocation at the remote audio processing computer as processed audio feed.

Embodiments may also include with the remote audio processing computer, synchronizing the processed audio feed captured at the disparate geolocations. Embodiments may also include downgrading one or more peer to peer transmissions in order to decrease transmission time enable the processed audio feed to remain synchronized with the remote audio processing computer.

Embodiments may also include concurrent with the receiving of the processed audio captured at the disparate geolocations to a remote audio processor computer as the processed audio feed, receiving video data for embedding into a virtual video environment. Embodiments may also include eliminating jitter in the virtual video environment by introducing a delay into the receiving of the video data for embedding into a virtual video environment. Embodiments may also include combining multiple video streams and the synchronized audio into the virtual video environment.

Implementations may include one or more of the following features. The method additionally may include the step of generating a virtual audience member in the audience seating, where the virtual audience member has a likeness of a non-fungible token.

DESCRIPTION OF THE DRAWINGS

The accompanying drawings, which are incorporated in and constitute a part of this specification, illustrate several embodiments of the disclosure. Together with the description, these drawings serve to explain the principles of the disclosure.

DETAILED DESCRIPTION

The present invention relates to a system including methods and apparatus for producing a virtual concert or other collaborative presentation or event, including but not limited to a theatrical performance, television or other live stage show, corporate gathering, religious gathering, etc.

In the following sections, detailed descriptions of examples and methods of the invention will be given. The description of both preferred and alternative examples, though thorough, are exemplary only. It is understood that, to those skilled in the art, various modifications and alterations may be apparent. The examples do not limit the broadness of the aspects of the underlying invention as defined by the claims. The examples are based on a musical collaboration but are intended to be illustrative of the ability to present remote collaborators of any kind together in a virtual environment to simulate a live event. Being a musical collaboration, the participants are referred to as "musicians," the venue is referred to as a "stage" or "virtual stage" or "concert venue" and the result is referred to as a "concert" or "virtual concert", viewable by "end users". However, these terms are interchangeable with other terms that would describe presenters or other collaborative participants, venue types and end result presentations for events other than musical concerts.

Figure 1:
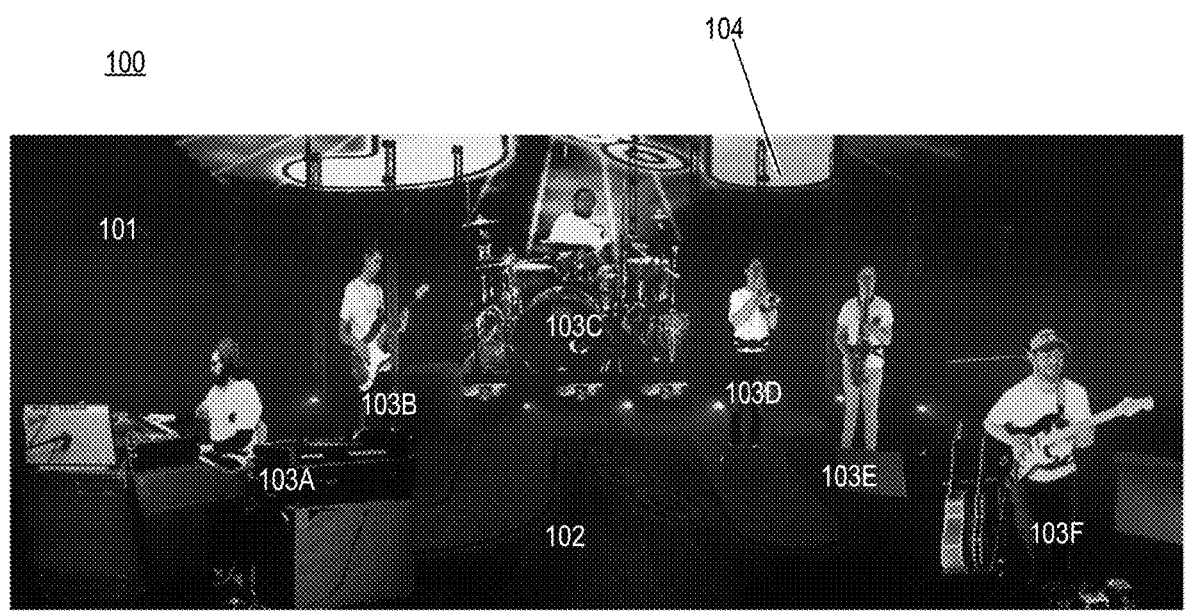
FIG. 1 illustrates an exemplary display of a virtual concert in accordance with the present invention.

Referring now to FIG. 1, an exemplary virtual concert 100 including a virtual concert venue 101 and virtual stage 102 populated with virtual representations of virtual musicians 103A-103F of actual live musicians compiled from audio and video feeds provided by them ("streamed") from disparate geolocations is illustrated. The virtual concert venue 101 may be fabricated from imagery reproducing one or more of: physical settings, virtual reality settings and augmented reality settings and ultimately used to create a virtual concert setting.

Virtual stage 102 includes virtual musicians 103A-103F arranged in a dynamic virtual arrangement or a static virtual arrangement. The virtual stage 102 may also be set against a virtual backdrop 104 that may be controllable by a production engineer or similar professional and/or a user/viewer of an enhanced production.

Virtual musicians 103A-103F may include projections based upon video and audio capture of actual musicians in real time or may be pre-recorded. Some preferred embodiments of the present invention include live streams of image and audio data from multiple musicians in disparate geolocations. Each live stream may be synchronized with the others and assembled into a central computer server located in a remote production studio or cloud environment, operated by a remote engineer. The virtual concert venue 100 may also include virtual imagery, such as one or more of a virtual: backdrop, simulated audience, simulated lighting trusses, stage ramps, audience seats, audience dance area and other elements of live concerts or other live presentations.

As discussed further below, in some embodiments, a virtual audience may include live streamed audio video data provided from audience members dispersed in disparate locations, and combined into a single virtual concert venue.

In some embodiments, the production engineer may manipulate the live stream data such that virtual musicians 103A-103F may be depicted with one or more instruments or other accessories desirable for deployment in a concert environment. In this way, virtual musicians may look similar or identical to their real-world counterparts, appearing as if they were performing together in a concert on a single physical stage.

Virtual backdrop 104 may be made to resemble a concert hall, a concert arena, a concert stadium or other location used by performing artists. In some embodiments, a band-specific background for a stage or any other suitable backdrop for a musical performance may be included in the virtual concert venue 100.

Additionally, in front of the virtual stage 102 may be virtual audience members. These audience members may by represented as one or more avatars or animated characters, or via live or pre-recorded video stream, embedded in the environment. An avatar may be a virtual caricature or alternative appearance (such as an animal) that represents an audience member. The audience member may be watching the virtual concert remotely while being represented in one of these or other ways in the virtual concert venue. In some embodiments, an avatar may be made to emulate, or may be replaced by, audio visual data of the audience member responding to the concert music and moving according to the music, such as by dancing, waving, pumping fists or other motion.

Figure 2:
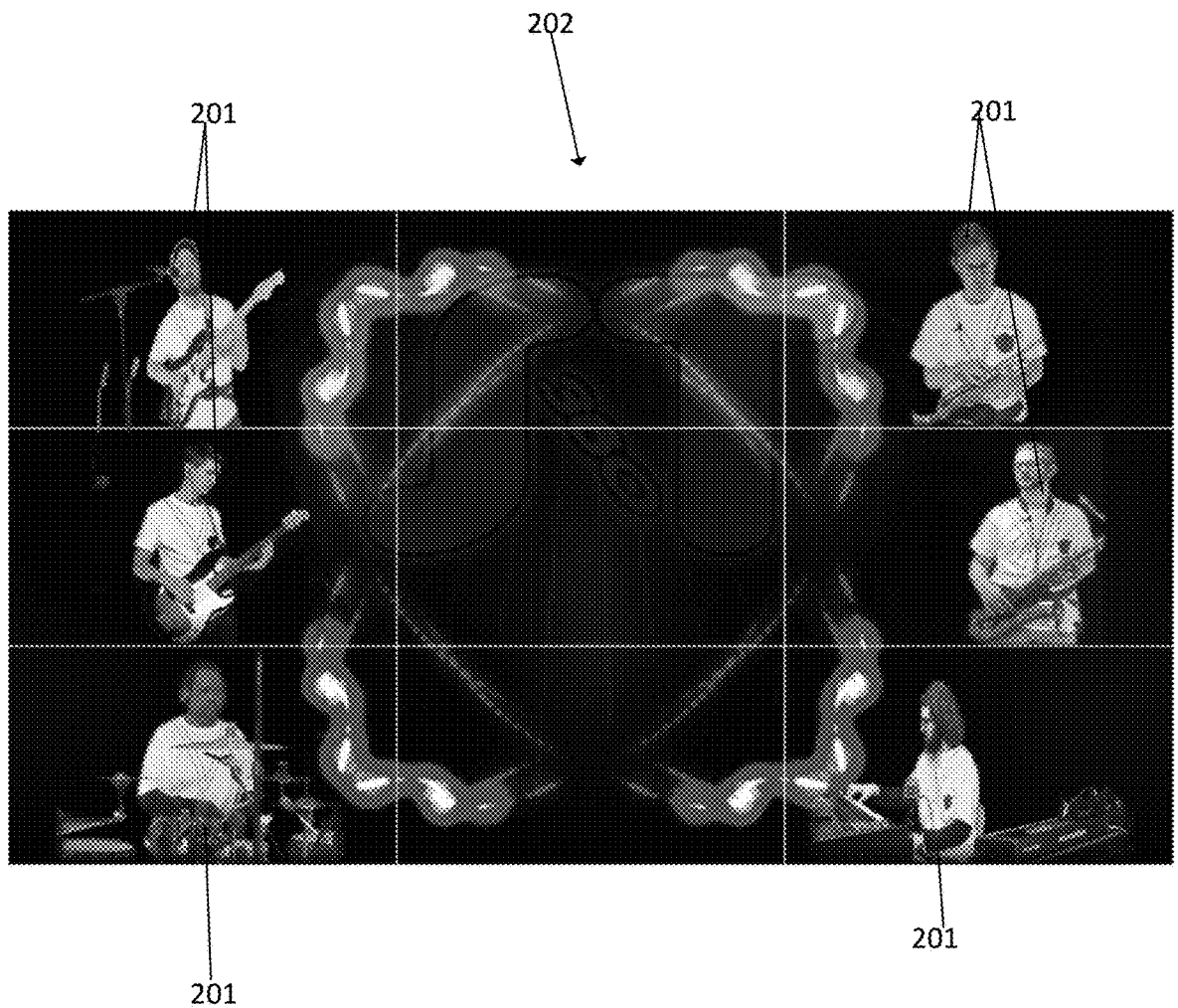
FIGS. 2, 2A-2J illustrate views of exemplary end user interactive interfaces according to various embodiments of the present invention.
Figure 2A:
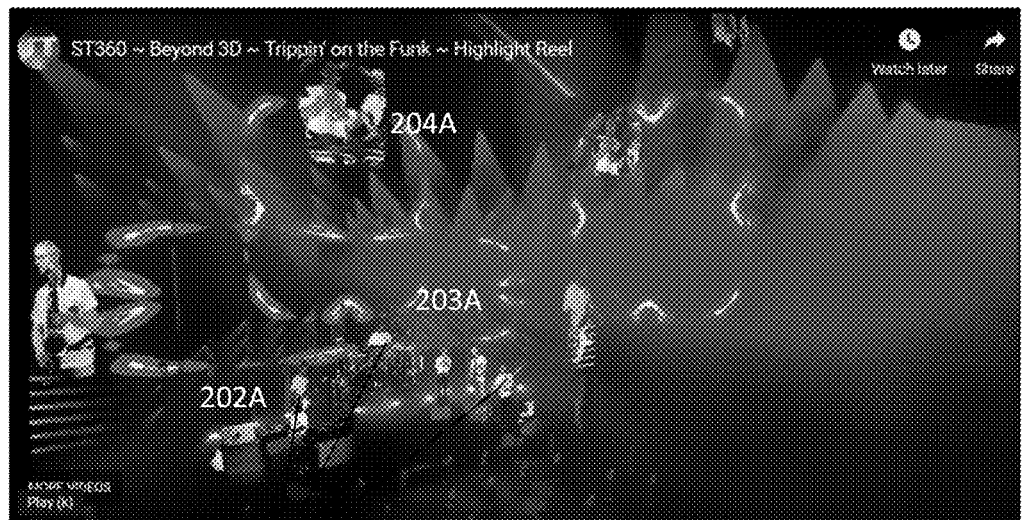
Figure 2B:
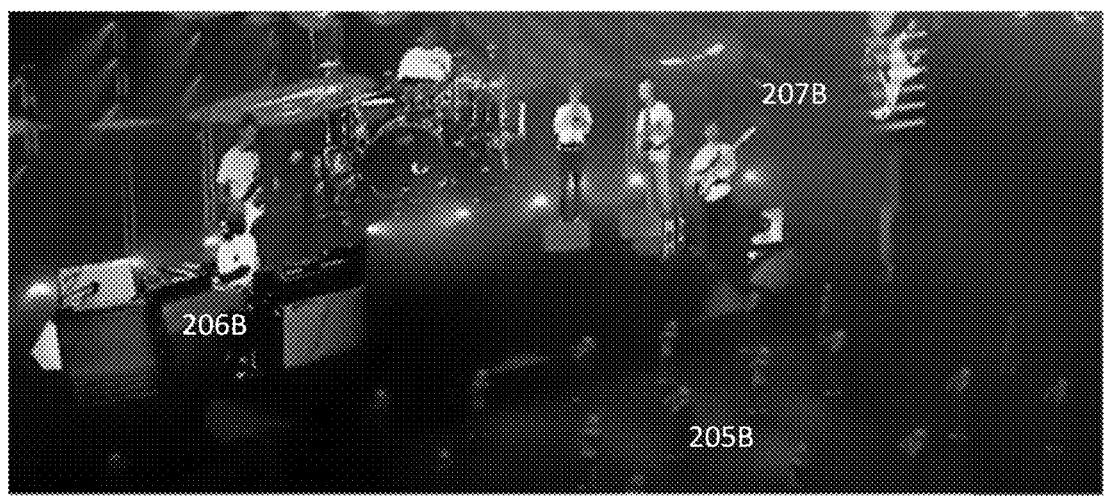
Figure 2C:
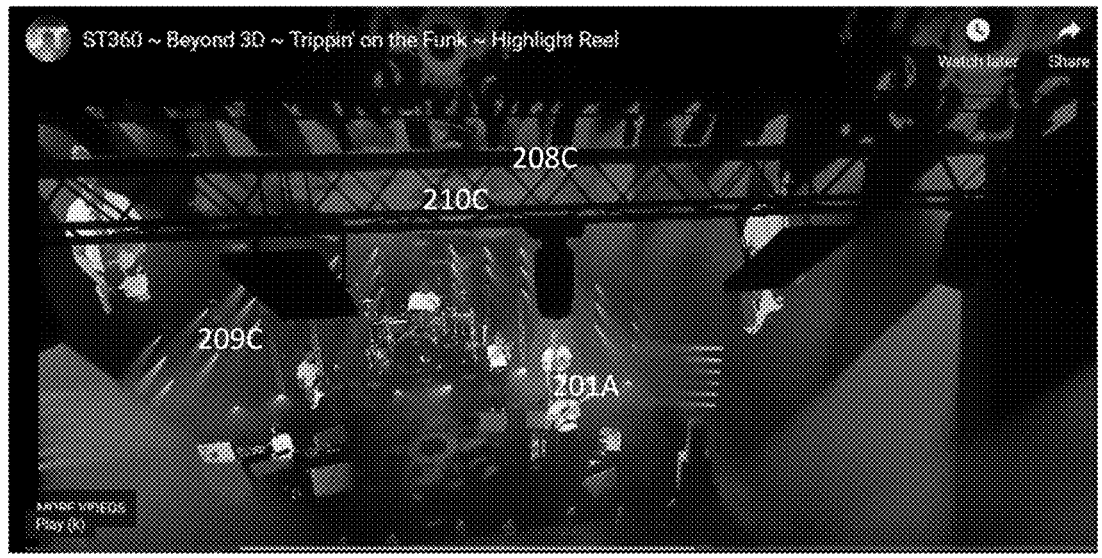
Figure 2D:
Figure 2E:
Figure 2F:
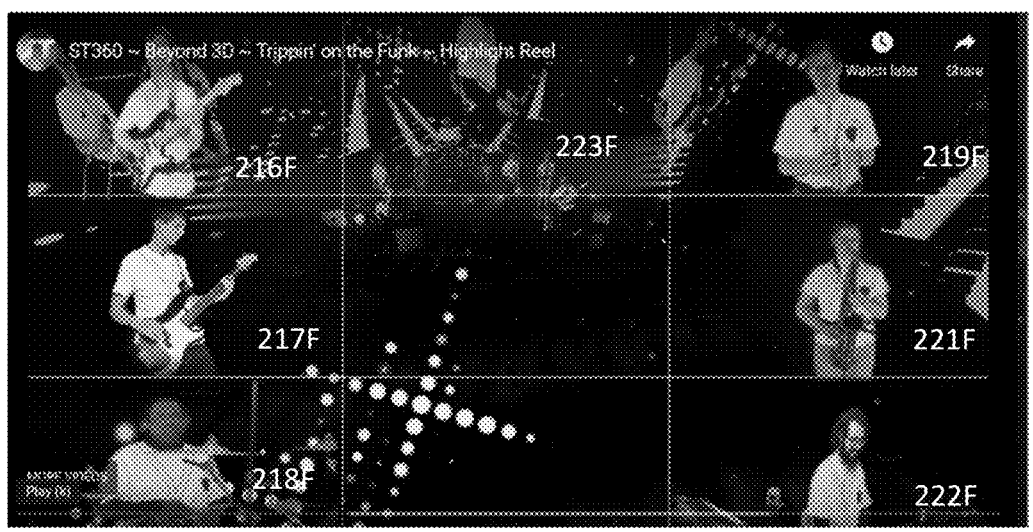
Figure 2G:
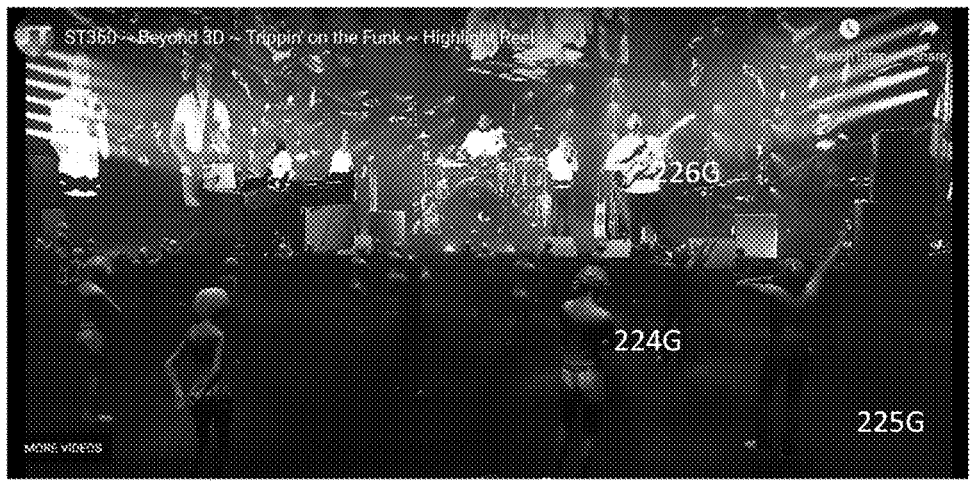
Figure 2H:
Figure 2I:
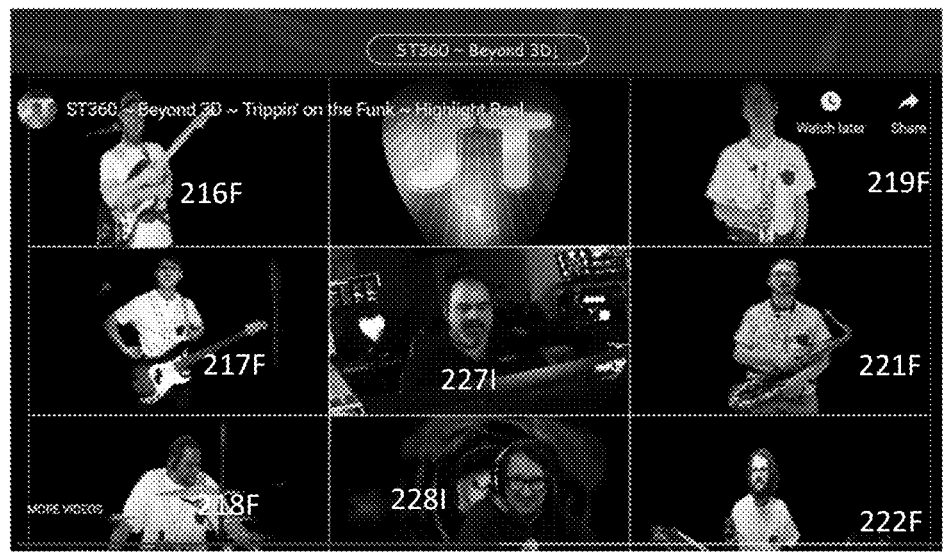
Figure 2J:
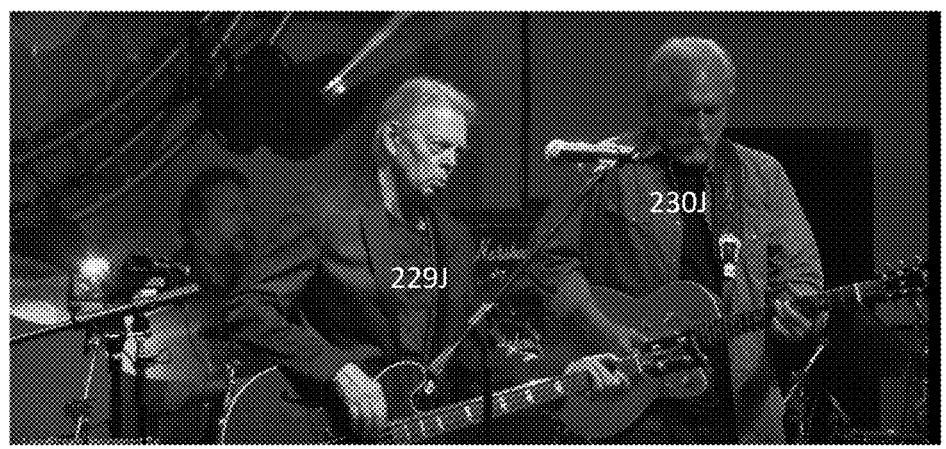

Referring now to FIGS. 2-2J, depictions of various embodiments of the present invention are illustrated, including the depictions of virtual concerts produced remotely from individual remote live streams of multiple musicians at two or more disparate geolocations. As shown in FIG. 2, individual remote musicians 201 may be arranged in a pattern, such as a grid, circle, oval or other polygonal shape. In addition, each individual remote video stream may include a virtual background designed to appear contiguous with the others so that it appears that the musicians are appearing in front of one common background 202. Remote production studio computers that may be operated by remote production engineers or may be programmed to operate automatically (such as those illustrated in FIG. 4) may generate a desired shape, such as a grid, and generation or selection of a virtual background, etc.

In other embodiments, as illustrated in FIGS. 2A-2J, aspects taken from data continuums may be combined in almost any manner that a creative remote production engineer desires. Referring ow to FIG. 2A, by way of non-limiting example, image data of multiple individual remote live streamed musicians 201A (or performers or collaborators) may be placed or embedded by the remote production engineer or automatic computer program into a singular virtual stage 202A or virtual concert venue 203A. Such singular virtual stage 202A or venue 203A may include or incorporate many other elements commonly seen in live musical concert venues or other live presentations, which may all be generated virtually, such as lighting and lighting apparatus, lasers, smoke, video projections, stage stairs, other special effects and/or extra-musical instruments, etc. In addition, a backdrop 204A may include blown up images of one or more performers, or other image data.

Referring now to FIG. 2B, another aspect that may be included in a virtual venue are avatars of musicians or other performers or presenters, audience members or dancers. In some embodiments, positions held by avatars 205B may be replaced with content from a continuum of image data (e.g., video data; prerecorded or streamed live from a disparate location) of a spectator, fan dignitary, and/or professional or amateur dancer. Virtual instruments 206B may also be arranged to suit a virtual venue 207B. Referring to FIG. 2C, architectural aspects 208C, such as lighting 209C and trusses 210C that may be arranged according to a particular venue may also be included. FIG. 2D illustrates musicians, or other participants in a virtual arrangement 211D created by the system and/or customized by a user. As illustrated, the arrangement is a V shape, however, they may be rearranged into a circle, oval, linear form or other disparate arrangements.

Referring now to FIG. 2E, in some embodiments, a user may highlight a particular participant and project that participant on a background, once or in multiple instances 212E. Multiple participants 212E-214E may be simultaneously highlighted. In FIG. 2F, multiple participants 216F-219F, 221F-222F are shown in separate windows and combined on a virtual stage in a single viewer screen 223F.

Referring now to FIG. 2G, one or more avatars 224G may be placed in an event virtual venue 225G. The avatars may be visually representative of a live person, or of virtual design. In some variants, an avatar 224G may be interspersed with live performers 226G. FIG. 2H illustrates another view of a virtual performance. Similarly, as illustrated in FIG. 2I, in some embodiments, live feeds of production members 2271-2281 may be interspersed with performers such as participants 216F-219F, 221F-222F.

Referring now to FIG. 2J, some combined venues will include only live performers 229J-230J. The performers 229J-230J may be streaming from disparate geospatial positions, including separate buildings.

In still another aspect, in some embodiments, a unique set of variables may be made available to subscribers as well as mixing and/or other engineering type controls that allows for fans, other engineers or amateurs to generate a sequence of audio and image data from a library of data continuums to create their own productions of a performance for viewing by themselves or transmitted to other viewers or end users.

Figure 3:
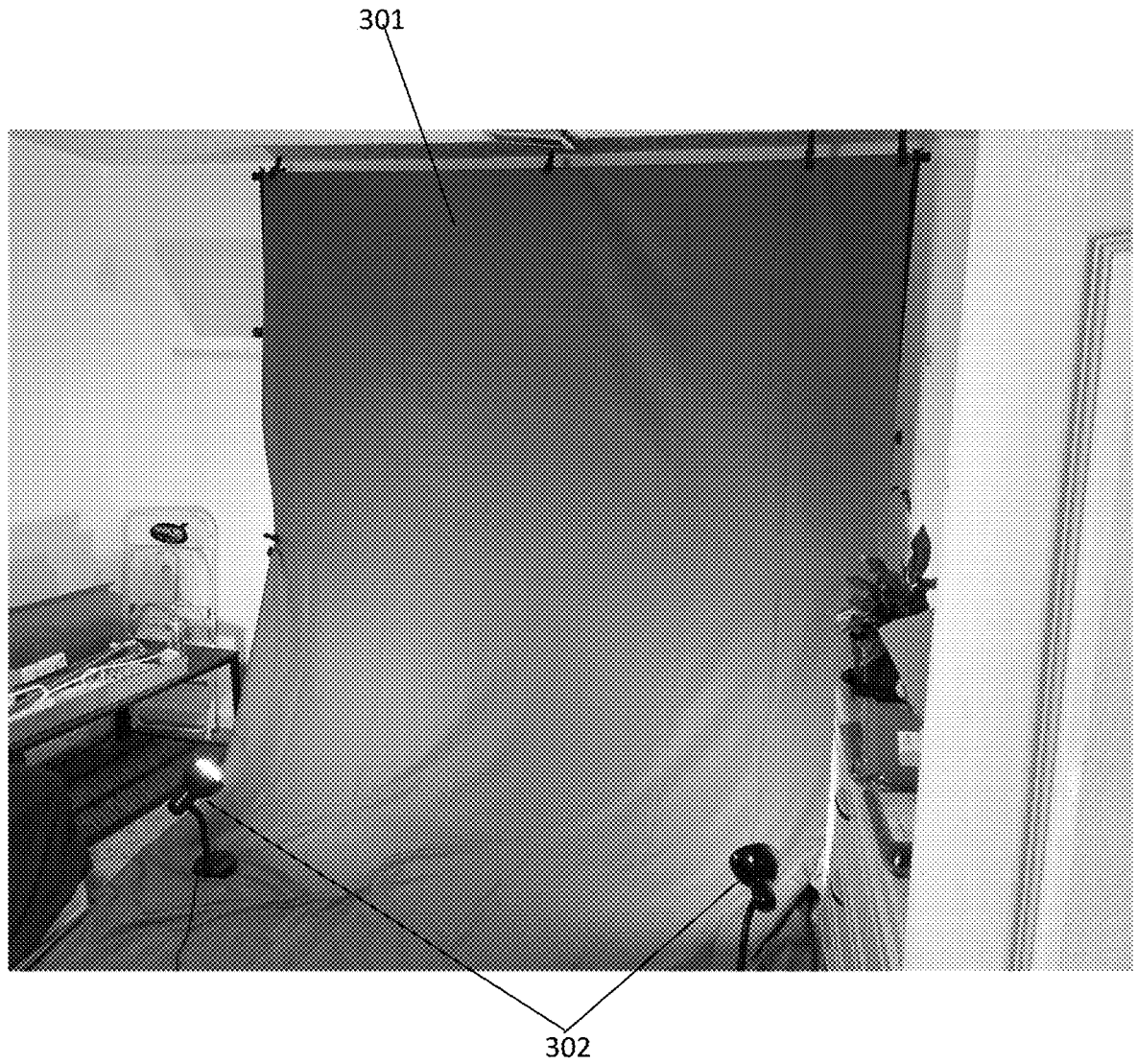
FIG. 3 illustrates a view of an exemplary musician-capture setup for creating a virtual concert.

FIG. 3 depicts a chroma key 301 and additional rear lighting 302 that may be used as a backdrop for generating audio visual data of a musician, audience, dancer, vocalist or other participant in a performance or presentation to be presented virtually via the present invention. The rear lighting 302 may be the same or different as lighting illustrated in FIG. 5 as lighting 501. Chroma key 301 may be a green screen, blue screen, magic pink, or any other suitable color, and may allow for a producer to impose almost any desired background onto the video of the musician. Rear lighting 302 may aid in making a performance participant look more realistic on an artificial background. In some embodiments, such chroma key and lighting backdrop may be replaced by capture of an actual environment existing behind and around the musicians and/or projected images created locally and/or streamed from a remote location.

Figure 4:
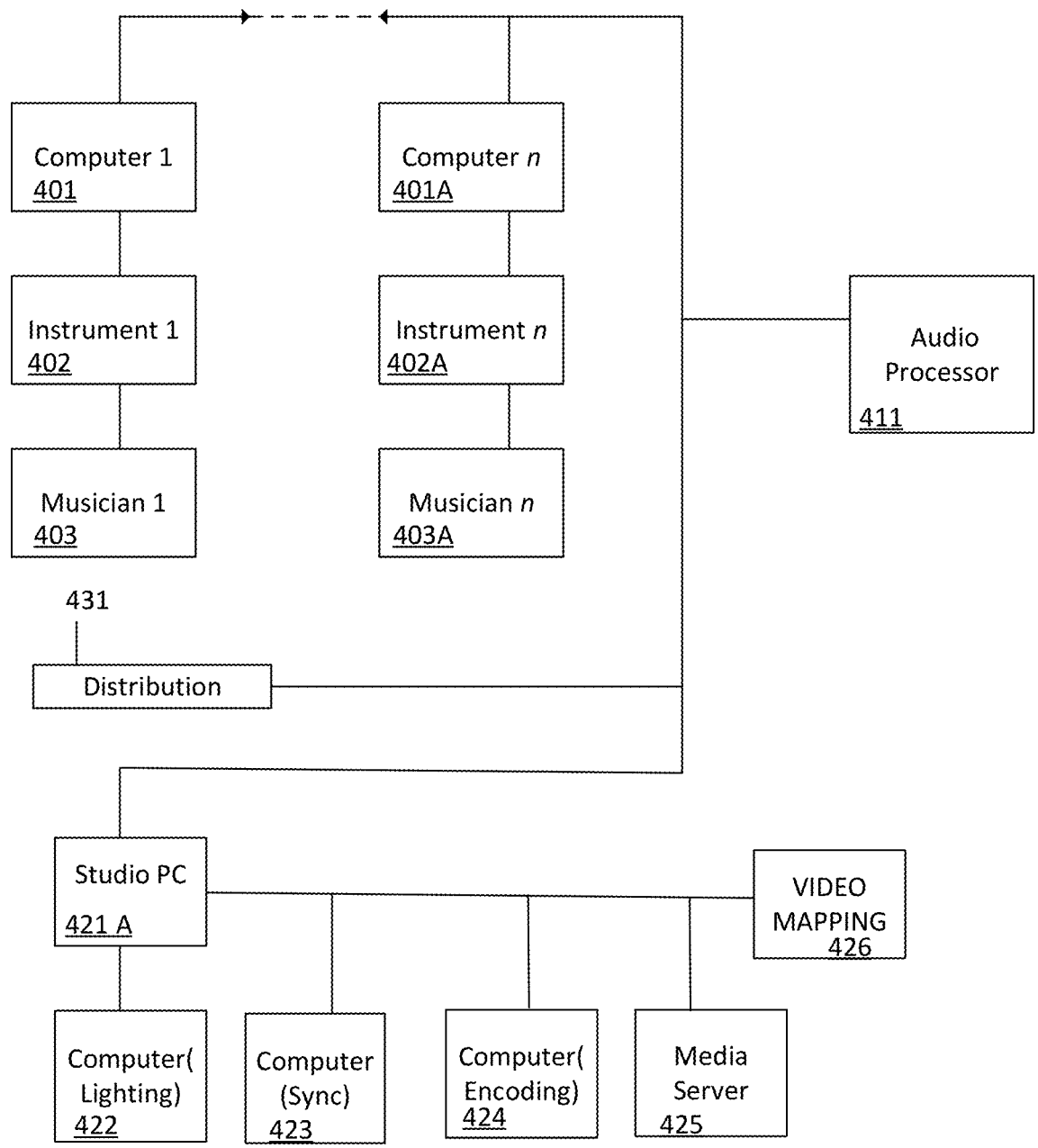
FIG. 4 illustrates an exemplary network diagram showing a network flow used in deploying a virtual concert.

Referring now to FIG. 4, a network diagram for a virtual concert as described herein is shown. The network diagram shows a generally four-part flow, as follows. First, musicians' 403, 403A computers 401, 401A relay audio data, as captured by microphones or directly from the instruments 402, 402A, to remote audio processor computers 411. The audio may be processed by remote audio processor computers 411 simultaneously or separately from the time the audio and/or video is sent to remote production studio 421A for implementation by one or more computers 422-426 which may have dedicated and general function. A high-quality version of these audio streams is received by the remote audio processor computers 411, which may be remote controlled from one or more remote studio locations 421A and synchronized, and may be enhanced via digital effects, etc. The resulting synchronized audio data is converted to a stereo or other multi-channel mix and relayed to the remote production studio computers 422-426.

Simultaneously, a peer-to-peer connection is established that includes each of the musicians and the remote production engineer(s) (within the constraints of the available bandwidth). In the example embodiment, an 8-way peer-to-peer network was established allowing the musicians and remote production engineers to remain audibly synchronized with each other while performing. In order to reduce lag from transmission time and enable a better synchronization result, one or more peer-to-peer transmissions may be downgraded in order to decrease transmission time.

Figure 4A:
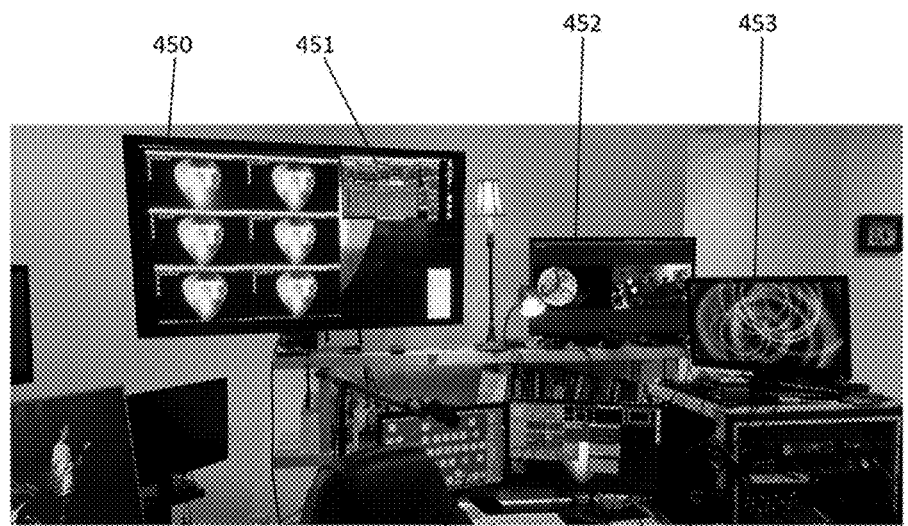
FIGS. 4A-4C illustrate exemplary views of elements used in deploying a virtual concert.
Figure 4B:
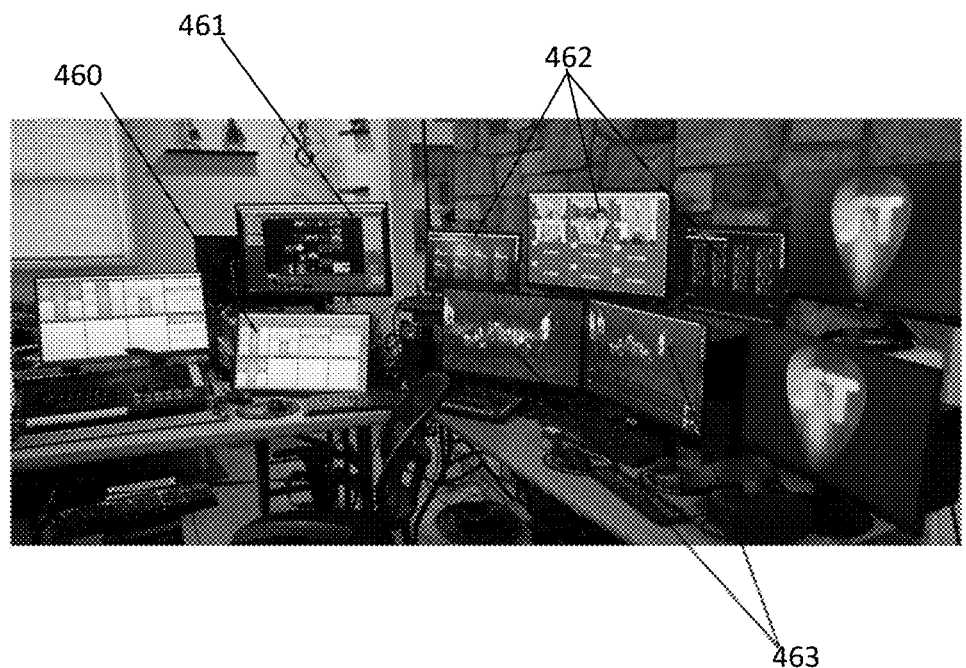

Referring now to FIG. 4B concurrently, one or more high quality data streams of data are transmitted to the studio or to cloud-based computers 462, where they will be converted into video for embedding into the virtual environment 463; while the processed audio data from processor 411 is streamed to the remote production studio or cloud environment to be synchronized with and embedded into the virtual environment along with the musicians' video streams. An amount of delay, for example a one-quarter second to one-second delay and preferably a one half second delay, may be introduced to an audio and/or video continuum to eliminate jitter in the data received from the transmission. Multiple video streams are combined into a single video virtual environment.

Figure 4C:
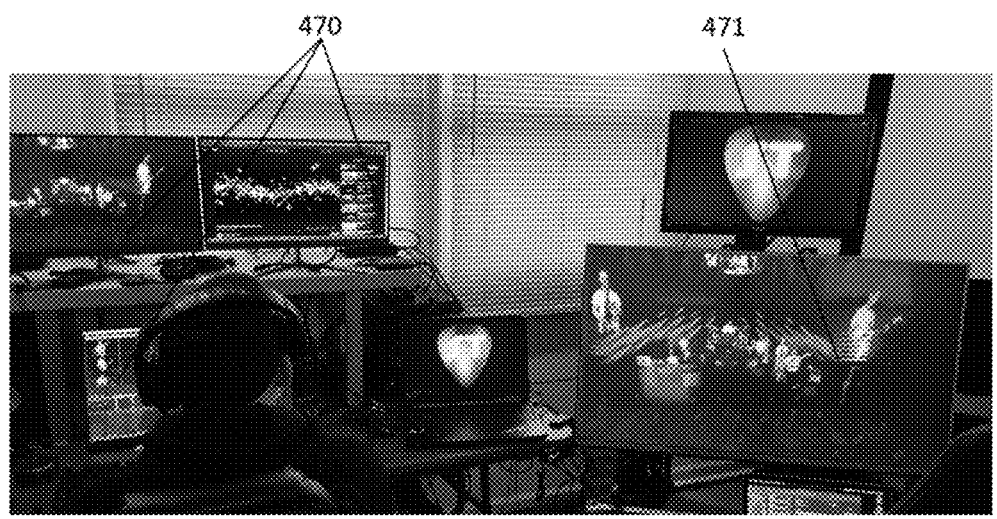

Referring now to FIGS. 4A-4C remote production studio computers 421A, 422-426 described herein and visually depicted in FIG. 4. Similar computers may be responsible for various production-related tasks 422, such as video mapping 461, lighting control 460, encoding 462, recording 470-471, synchronization 454, media server 455, and image generation 452, 453. Image markers 450 and 451 represent, as utilized in this embodiment, a remote desktop for view and control of the client computers at each musician's location, and remote audio mixing studio computers in a remote studio or cloud location depicted in FIG. 4 as audio processor 411. In some embodiments, these systems may be modified or augmented and in some cases an engineer or other end user may adjust audio and/or image data continuums based upon a subjective preference of the end user.

Synchronization may proceed by assigning a time index identifier to a given quantum of audio/video included in a continuum of data. Other quanta of audio/video (e.g., from other musicians) having the same or nearly the same time index identifier may be distributed to the next step simultaneously. According to the present invention, synchronization may be accomplished via digital clocks that are dispersed to disparate locations from which audio and/or video data is streamed, the clocks are synchronized so that when audio/video is transmitted and received at another geolocation (sometimes referred to as "streamed" herein), and an engineer or other operator and/or automated program at a receiving location may align disparate sources of audio and image data based upon the synchronized clocking signals. A mixer or other apparatus capable of receiving multiple audio and/or video image continuums may be operated to align a playback sequence and timing of multiple disparate sources of audio and video data. According to the present invention, an audio continuum and/or video continuum of data may be synchronized to within 10 milliseconds or less.

Accordingly, two or more streams of data continuums: a) a high-resolution data stream to the remote production studio or cloud environment: b) a low-resolution stream peer to peer by and between musicians, remote production engineers and/or other contributors; and c) a synchronized data continuum comprising timing signals associated with specific quanta of data may be included in any of the audio and/or video data continuums. In this application, a consistency of data quality and alignment of data from multiple data continuums can become more important than the speed of arrival of a specific quantum of data.

In another aspect, combined processed audio, video, virtual concert hall or other environment, and studio effects may then be sent to server 431, visually depicted 470 for streaming to the end user or for recording to media or digital file for distribution. A signal comprising synchronized audio and video data, a chosen video arrangement, and other qualities desirable for a virtual concert may be created. Simultaneously, additional video data may be sent to this system allowing for multiple synchronized 2D, 3D or virtual reality scenes to be mixed in real-time and streamed and/or recorded; the result may be previewed on monitor 471.

Figure 5:
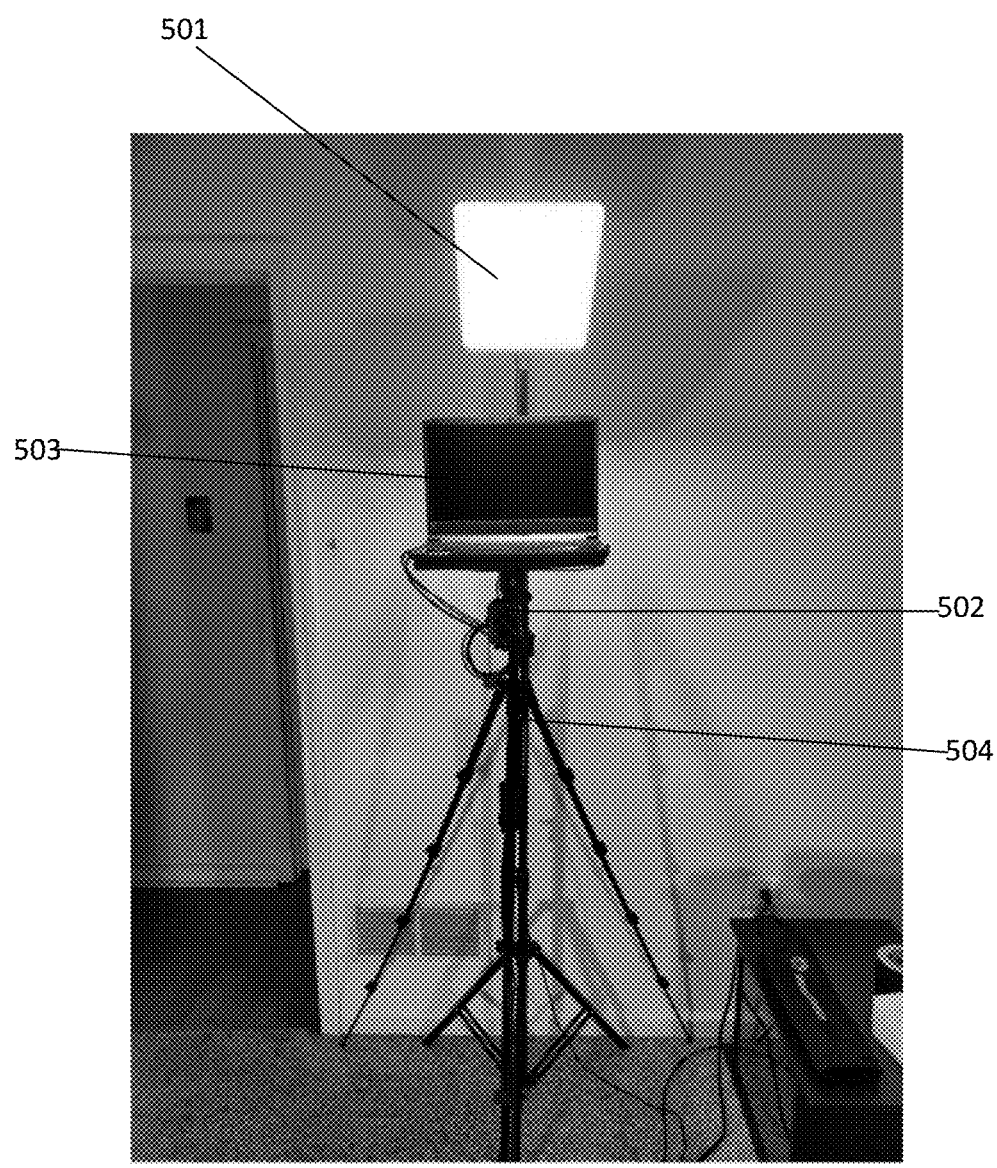
FIG. 5 illustrates exemplary musician-capture apparatus for creating a virtual concert.

Referring now to FIG. 5, an exemplary view of a setup for broadcasting a musician on to the virtual stage is shown. The setup may comprise lighting 501, connected image-capture device 502, computer 503, and support 504. Lighting 501 may be a lamp or other illumination apparatus capable of providing sufficient light to create a production-quality appearance for the musician. The musician may stand in front of web-connected image-capture device 502 before, during and after playing music. One or more web-connected image-capture device 502 may be in logical connection with computer 503. Computer 503 may be in logical connection with a communications protocol, such as the Internet, to transmit images and video captured by web-connected image-capture device 502. One or both of computer 503 and web-connected image-capture device 502 may be supported 504 by tripod.

The setup may also include a microphone for capturing audio. The microphone may be a boom microphone, a standalone microphone, a microphone attached to computer 503 or a microphone attached to a headset worn by the musician. In some embodiments, including the present, audio may proceed directly from an instrument to computer 503 via an attached or embedded audio capture device. The setup shown in FIG. 5 will generally be positioned in the front of the musician. The setup shown in FIG. 3 will generally be a backdrop for the musician. In addition, earphones may be fitted in each musician (and/or vocalist) that allows the musician to accurately hear his/her own performance and/or some or all aspects of the other musician(s), performer(s) and/or remote production studio engineer(s).

Figure 6:
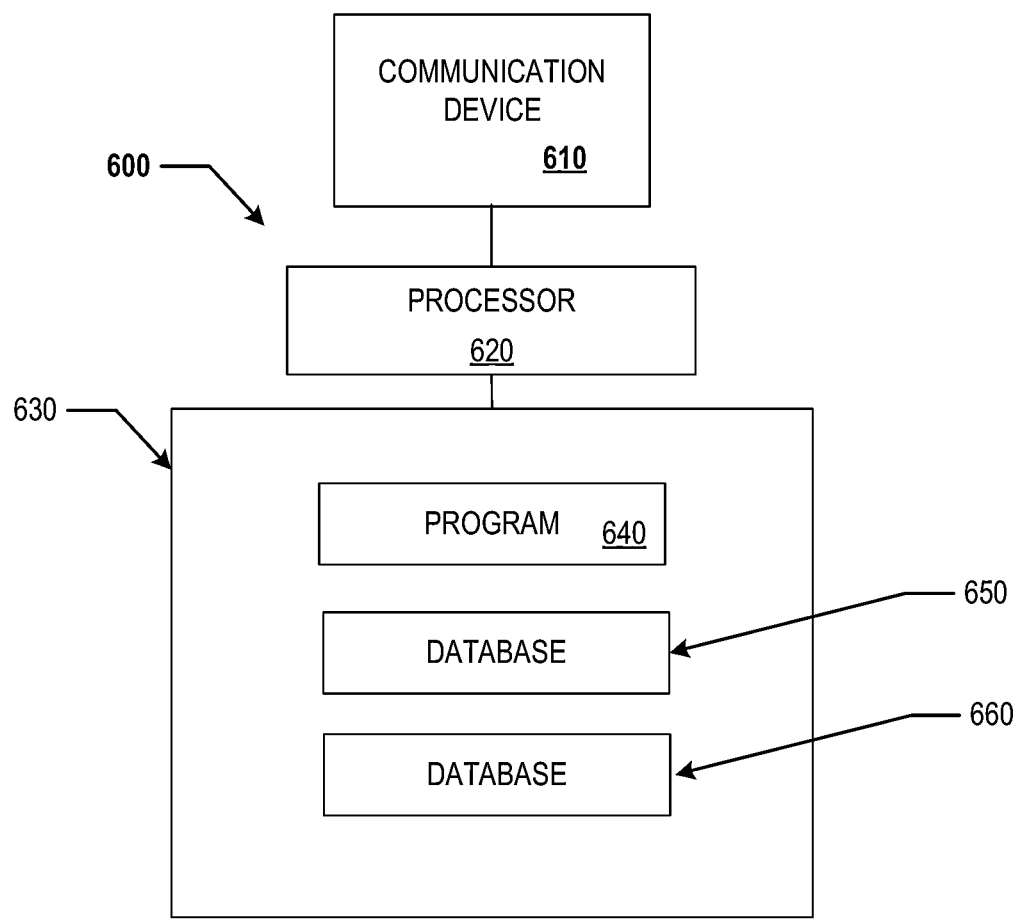
FIG. 6 illustrates an exemplary controller for use in accordance with the present invention.

Referring now to FIG. 6, an automated controller is illustrated that may be used to implement various aspects of the present invention, in various embodiments, and for various aspects of the present invention. Controller 600 may be included in one or more servers and/or rack mounted processor units located in the remote production studios or cloud environment. Controller 600 may be included in one or more of the apparatus described above, and controlled via wireless tablet or handheld device, such as a smart device. Controller 600 includes a processor unit 620, such as one or more semiconductor-based processors, coupled to a communication device 610 configured to connect to a communication network via wired ethernet connection. (not shown in FIG. 6). Controller 600 may also include a digital clock that may attach a time index identifier to each data stream. The communication device 610 may be used to communicate, for example, via a distributed broadband IP network such as the Internet or other distributed logic communication network.

The processor unit 620 is also in communication with a storage device 630. The storage device 630 may comprise any appropriate information storage device, including combinations of digital data storage devices (e.g., solid state drives and hard disk drives), optical storage devices, and/or semiconductor memory devices such as Random Access Memory (RAM) devices and Read Only Memory (ROM) devices.

The storage device 630 can store a software program 640 with executable logic for controlling the processor unit 620. The processor unit 620 performs instructions of the software program 640, and thereby operates in accordance with the present invention. The processor unit 620 may also cause the communication device 610 to transmit information, including, in some instances, control commands to operate apparatus to implement the processes described above. The storage device 630 can additionally store related data in a database 650 and database 660, as needed. In some embodiments a multitrack recording of each video and audio stream may be recorded locally for post-production use.

Figure 7:
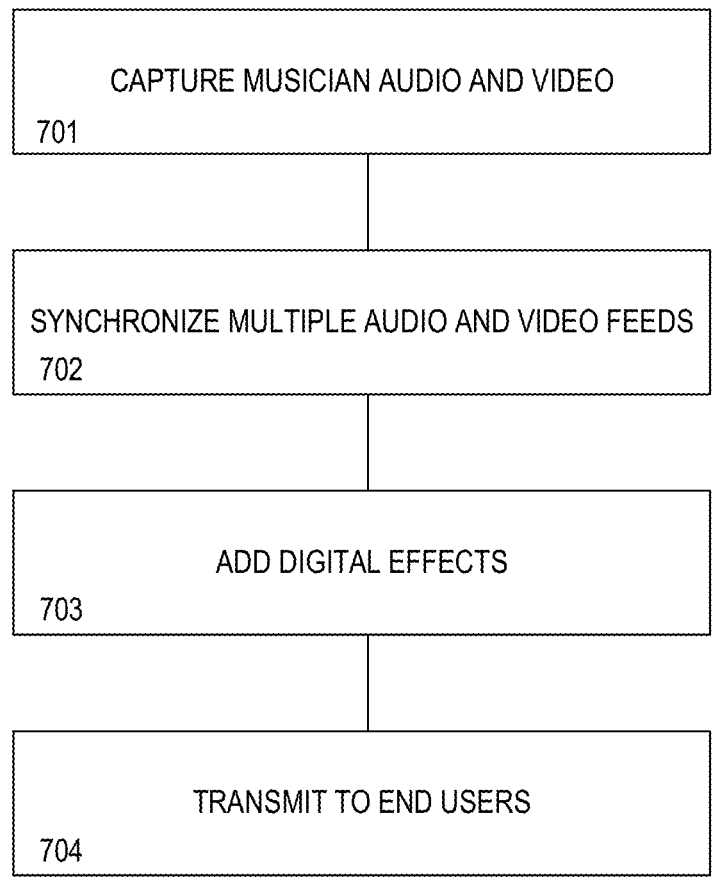
FIG. 7 illustrates a flowchart of method steps that may be performed in some embodiments of the present invention.

Referring now to FIG. 7, a flowchart showing exemplary method steps for performing the present invention is shown. At step 701, one or more musicians may have their audio and video recorded. The video may be recorded by an image-capture device in logical communication with a communications network, such as the internet, or in logical communication with an internet-connected computer. The musician may be positioned in front of a green screen. The audio from the musician's instrument(s) and/or voice may be captured via microphone and/or via a direct feed, utilizing a multi-track audio capture device attached to an internet-connected computer. Each musician may be performing at the same or a different time as any other musician, and one or more musicians may be located remotely from each other. The captured audio and video may be transmitted via the computer to a remote multimedia processor.

At step 702, the multimedia processor may synchronize multiple audio and video feeds from the various musicians. This synchronization may occur by dividing the audio and video feeds into subsets and assigning each of these subsets a time index.

At step 703, digital effects may be added to the musicians' synchronized audio and video feeds. This may include imposing a virtual background against the musicians' video feeds, which may be simplified if the video feed includes a green screen or other chroma key. If the video feed does not include a green screen, then the processing step may include isolating the video of the musician from the musician's real-life background so that the virtual background can be inserted. The virtual background may include a virtual concert stage. This may have effects synchronized with the backgrounds of other musicians. In this way, each musician may appear to be playing on the same virtual stage. Virtual pyrotechnics, lighting, projectiles, and other effects may be added at this step. The relative positions of each virtualized musician may be fixed here to determine the display that is desired to be shown to end users.

At step 704, the synchronized audio, video, and effects may be transmitted to a server for distribution to end users. This may occur via streaming (live, real-time, or nearly real-time) to an application usable on smart devices, computers, or virtual-reality headsets. This may create a display that resembles the musicians (whose video was captured at step 701) playing on the same virtual concert stage. In some embodiments, the application may be operable to allow the end user to deploy an avatar to a position proximate to the virtual concert stage, such that the virtual concert appears to have an audience.

Figure 8:
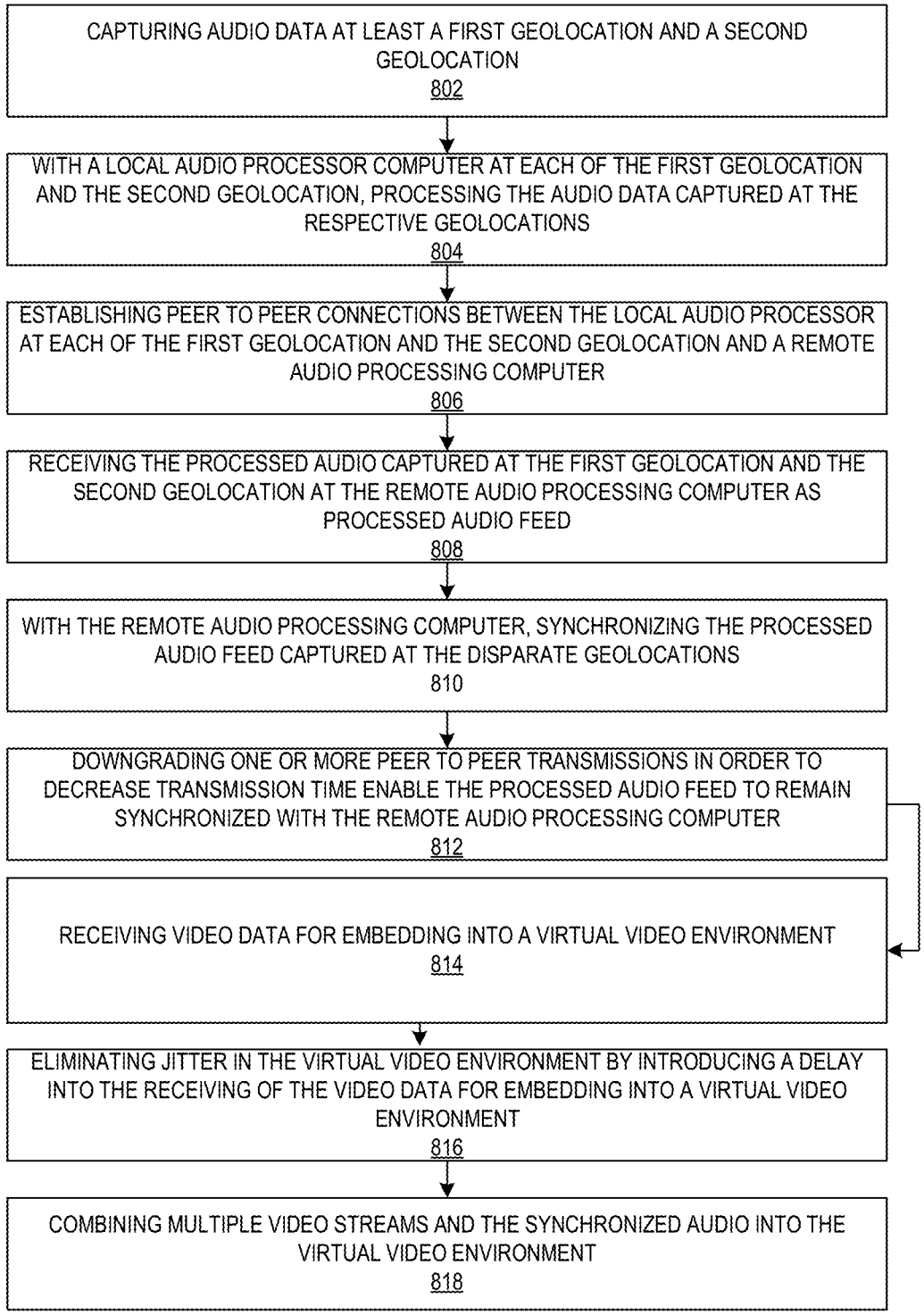
FIG. 8 illustrates a flowchart of additional method steps that may be performed in some embodiments of the present invention.

Referring now to FIG. 8 is a flowchart that shows a method for generating a collaborative concert, according to some embodiments of the present disclosure.

At step 802, the method may include capturing audio data at least a first geolocation and a second geolocation. At step 804, the method may include, with a local audio processor computer at each of the first geolocation and the second geolocation, processing the audio data captured at the respective geolocations. At step 806, the method may include establishing peer to peer connections between the local audio processor at each of the first geolocation and the second geolocation and a remote audio processing computer.

At step 808, the method may include receiving the processed audio captured at the first geolocation and the second geolocation at the remote audio processing computer as processed audio feed. At step 810, the method may include, with the remote audio processing computer, synchronizing the processed audio feed captured at the disparate geolocations. At step 812, the method may include downgrading one or more peer to peer transmissions in order to decrease transmission time enable the processed audio feed to remain synchronized with the remote audio processing computer.

At step 814, the method may include, concurrent with the receiving of the processed audio captured at the disparate geolocations to a remote audio processor computer as the processed audio feed, receiving video data for embedding into a virtual video environment. At step 816, the method may include eliminating jitter in the virtual video environment by introducing a delay into the receiving of the video data for embedding into a virtual video environment.

At step 818, the method may include combining multiple video streams and the synchronized audio into the virtual video environment. In some embodiments, the method of claim 1, additionally comprising the step of receiving multiple audio continuums as the processed audio feed and aligning timing of the audio continuums into a playback sequence. In some embodiments, the method may additionally include the step of receiving multiple video continuums as processed video feeds and aligning timing of the video continuums into a playback sequence.

In some embodiments, the method may additionally include the step of generating avatars and including the avatars in the virtual video environment. In some embodiments, the method may additionally include the step of fashioning the avatars to resemble a likeness of a physical person. In some embodiments, the method may additionally include the step of fabricating a virtual concert venue by combining imagery reproduced from one or more of, the method may include performing one or more additional steps.

In some embodiments, physical settings, virtual reality settings and augmented reality settings and may be included in a virtual video environment, the method may additionally include inserting multiple virtual musicians in the virtual video environment. In some embodiments, the method may additionally include the step of dynamically arranging the virtual musicians in the virtual video environment.

In some embodiments, the method may additionally include the step of generating a virtual stage and including the virtual stage in the virtual video environment. In some embodiments, the method may additionally include the step of generating a virtual backdrop and including the virtual backdrop in the virtual video environment. In some embodiments, the method may additionally include the step of generating a virtual likeness of a production professional and including the virtual likeness of a production professional in the virtual video environment.

In some embodiments, the method may additionally include receiving a video stream of a first musician at the first geolocation and synchronizing the processed audio feed with the video stream of the first musician at the first geolocation. In some embodiments, the method may additionally include receiving a video stream of a second musician at a second geolocation and synchronizing the processed audio feed with the video stream of the musician at the second geolocation.

In some embodiments, the method may additionally include the step of generating virtual imagery and including the virtual imagery in the virtual video environment. In some embodiments, the method may additionally include virtual imagery that is architectural aspects of a venue and/or lighting trusses.

In some embodiments, the virtual imagery may include one or more of: an audience dance floor; audience seating; and a virtual audience member in the audience seating. In some embodiments, the virtual audience member may have a likeness of a non-virtual person, such as a real life person in the physical world.

The method may include capturing audio data at least a first geolocation and a second geolocation with a local audio processor computer at each of the first geolocation and the second geolocation, and processing the audio data captured at the respective geolocations. At step 806, the method may include establishing peer to peer connections between the local audio processor at each of the first geolocation and the second geolocation and a remote audio processing computer.

CONCLUSION

Several embodiments of the present disclosure have been described. While this specification contains many specific implementation details, these should not be construed as limitations on the scope of any disclosures or of what may be claimed, but rather as descriptions of features specific to particular embodiments of the present disclosure. While embodiments of the present disclosure are described herein by way of example using several illustrative drawings, those skilled in the art will recognize the present disclosure is not limited to the embodiments or drawings described. It should be understood the drawings and the detailed description herein are not intended to limit the present disclosure to the form disclosed. Instead, the present disclosure is meant to encompass modifications, equivalents, and alternatives falling within the spirit and scope of embodiments of the present disclosure, as defined by the appended claims.

The headings used herein are for organization purposes only and are not meant to be used to limit the scope of the description or the claims. As used throughout this application, the word "may" is used in a permissive sense (i.e., meaning having the potential to), rather than the mandatory sense (i.e., meaning must). Similarly, the word "include" (and derivatives thereof) means including but not limited to. To facilitate understanding, like reference numerals have been used, where possible, to designate like elements common to the figures.

The phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

The term "a" or "an" entity means one or more of that entity. As such, "a"/"an," "one or more," and "at least one" are used interchangeably herein. Additionally, "comprising," "including," and "having" can be used interchangeably.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination an, in some cases, be excised from the combination, and the claimed combination may be directed to a sub-combination or a variation of a sub-combination.

What is claimed is:

1. A method for generating a collaborative concert with participants at disparate geolocations, the method comprising the steps of:
    capturing audio data at at least a first geolocation and a second geolocation;
        with a local audio processor computer at each of the first geolocation and the second geolocation, processing the audio data captured at the respective geolocations;
        establishing peer to peer connections between the local audio processor computer at each of the first geolocation and the second geolocation and a remote audio processing computer;
        receiving the processed audio captured at the first geolocation and the second geolocation at the remote audio processing computer as processed audio feed;
        with the remote audio processing computer, synchronizing the processed audio feed captured at the disparate geolocations;
        by remotely controlling from the remote audio processing computer, downgrading audio quality of one or more peer to peer transmissions in order to decrease transmission time to ensure that the processed audio feed remain synchronized with the remote audio processing computer;
    concurrent with the receiving of the processed audio captured at the disparate geolocations to the remote audio processing computer as the processed audio feed, receiving video data for embedding into a virtual video environment;
    eliminating jitter in the virtual video environment by remotely controlling from the remote audio processing computer to introduce a delay into the receiving of the video data for embedding into the virtual video environment; and
    combining multiple video streams and the synchronized audio into the virtual video environment.

2. The method of claim 1, additionally comprising the step of receiving multiple audio continuums as the processed audio feed and aligning timing of the audio continuums into a playback sequence.

3. The method of claim 2, additionally comprising the step of receiving multiple video continuums as processed video feeds and aligning timing of the multiple video continuums into a playback sequence.

4. The method of claim 2 additionally comprising the step of generating avatars and including the avatars in the virtual video environment.

5. The method of claim 4, additionally comprising the step of fashioning the avatars to resemble a likeness of a physical person.

6. The method of claim 4, additionally comprising the step of fabricating a virtual concert venue by combining imagery reproduced from one or more of: physical settings, virtual reality settings and augmented reality settings and including the virtual concert venue in the virtual video environment.

7. The method of claim 4 additionally comprising the step of including multiple virtual musicians in the virtual video environment.

8. The method of claim 7 additionally comprising the step of dynamically arranging the multiple virtual musicians in the virtual video environment.

9. The method of claim 8 additionally comprising the step of generating a virtual stage and including the virtual stage in the virtual video environment.

10. The method of claim 9 additionally comprising the step of generating a virtual backdrop and including the virtual backdrop in the virtual video environment.

11. The method of claim 10 additionally comprising the step of generating a virtual likeness of a production professional and including the virtual likeness of the production professional in the virtual video environment.

12. The method of claim 9 additionally comprising receiving a video stream of a first musician at the first geolocation and synchronizing the processed audio feed with the video stream of the first musician at the first geolocation.

13. The method of claim 12 additionally comprising receiving a video stream of a second musician at the second geolocation and synchronizing the processed audio feed with the video stream of the second musician at the second geolocation.

14. The method of claim 13 additionally comprising the step of generating virtual imagery and including the virtual imagery in the virtual video environment.

15. The method of claim 14 wherein the virtual imagery comprises architectural aspects of a venue.

16. The method of claim 14 wherein the virtual imagery comprises lighting trusses.

17. The method of claim 14 wherein the virtual imagery comprises an audience dance floor.

18. The method of claim 14 wherein the virtual imagery comprises audience seating.

19. The method of claim 18 additionally comprising the step of generating a virtual audience member in the audience seating, wherein the virtual audience member has a likeness of a non-virtual person.

20. The method of claim 18 additionally comprising the step of generating a virtual audience member in the audience seating, wherein the virtual audience member has a likeness of a non-fungible token.

* * * * *